United States Patent [19]
Kerklies et al.

[11] Patent Number: 5,267,640
[45] Date of Patent: Dec. 7, 1993

[54] TRANSFER STATION ASSEMBLY FOR SCRAPER-CHAIN CONVEYORS

[75] Inventors: Bodo Kerklies; Wilfried Mertens; Bernd Steinkuhl, all of Lunen; Bernhard Wleklinski, Werne, all of Fed. Rep. of Germany

[73] Assignee: Westfalia Becorit Industrietechnik GmbH, Fed. Rep. of Germany

[21] Appl. No.: 2,232

[22] Filed: Jan. 8, 1993

[30] Foreign Application Priority Data

Jan. 11, 1992 [DE] Fed. Rep. of Germany ....... 4200565

[51] Int. Cl.$^5$ ............................................. B65G 15/24
[52] U.S. Cl. ................................. 198/607; 198/735.2; 198/735.6
[58] Field of Search ............ 198/560, 606, 607, 735.2, 198/735.6, 599

[56] References Cited

U.S. PATENT DOCUMENTS

| | | | |
|---|---|---|---|
| 3,300,025 | 1/1967 | Paul et al. | 198/606 |
| 3,855,805 | 12/1974 | Nakajima | 198/599 |
| 4,586,753 | 5/1986 | Braun et al. | 198/560 |
| 4,673,079 | 6/1987 | Grundken et al. | 198/606 |
| 4,733,770 | 3/1988 | Temme | 198/606 |
| 4,766,992 | 8/1988 | Braun et al. | 198/606 |
| 5,161,671 | 11/1992 | Wleklinski et al. | 198/606 |
| 5,186,309 | 2/1993 | Wleklinski | 198/606 |

FOREIGN PATENT DOCUMENTS

| | | | |
|---|---|---|---|
| 2237976 | 2/1974 | Fed. Rep. of Germany | 198/606 |
| 2600999 | 7/1977 | Fed. Rep. of Germany | 198/606 |
| 2659855 | 8/1977 | Fed. Rep. of Germany | 198/606 |
| 2154531 | 9/1985 | United Kingdom | 198/599 |

*Primary Examiner*—Joseph E. Valenza
*Attorney, Agent, or Firm*—Samuels, Gauthier & Stevens

[57] ABSTRACT

A transfer station between a scraper-chain face conveyor and a scraper-chain roadway conveyor in a mine working has a frame for guiding the scraper-chain assemblies of the conveyor so that material discharges from the face conveyor to the roadway conveyor. The frame has a pair of spaced-apart side walls with identical connecting blocks fitted to their exteriors. The connecting blocks have pockets for receiving couplers and depressions which form bearing half-shells for a support for a drum around which the scraper-chain assembly of the roadway conveyor passes. The connecting blocks on each side wall can connect with connecting blocks of the drum support or with connecting blocks on an endmost ramp pan of the roadway conveyor so that the pan and the drum support can be interchanged in position.

17 Claims, 4 Drawing Sheets

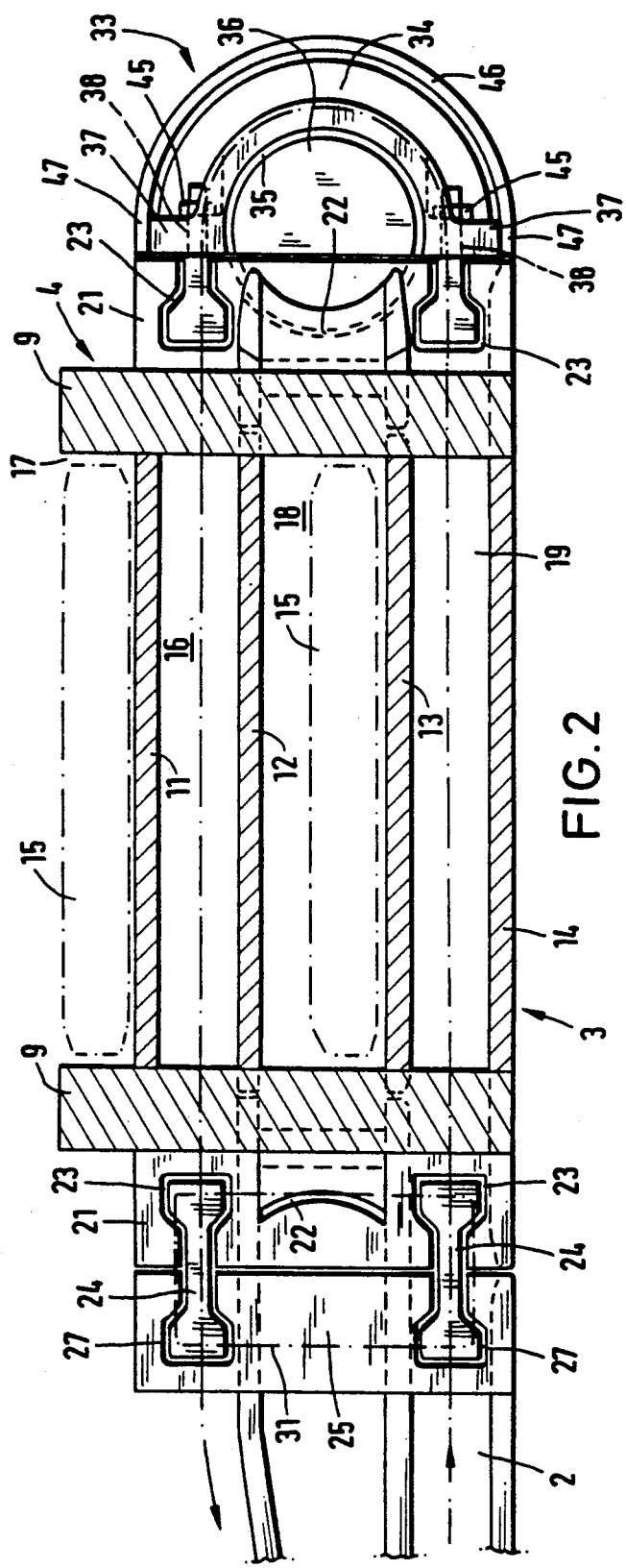
FIG. 2
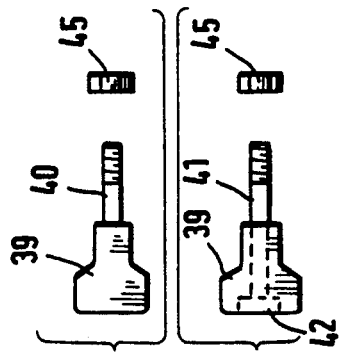
FIG. 4
FIG. 5
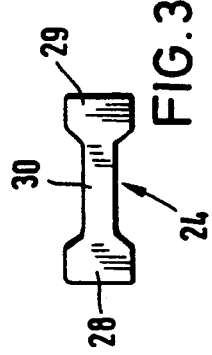
FIG. 3

TRANSFER STATION ASSEMBLY FOR SCRAPER-CHAIN CONVEYORS

FIELD OF THE INVENTION

The invention relates to a transfer station for effecting transfer of material between a face scraper-chain conveyor and a gate or roadway scraper-chain conveyor extending perpendicular to one another.

BACKGROUND OF THE INVENTION

It is known to construct such a transfer station as a frame or assembly which guides the upper and lower rums of the scraper-chain assemblies of the conveyors in an intersecting manner. Each scraper-chain assembly runs through the frame and is entrained around a drum supported by the frame. The frame is equipped with connections for detachably uniting an endmost pan of the gate conveyor and a support for the drum of the gate conveyor.

A transfer station of this construction is known from U.S. Pat. No. 4,673,079. The frame is here constructed as a so-called cross frame, in which the top run and bottom run of the face and gate conveyors cross over the frame so that the top run of the gate conveyor travels between the top run and the bottom run of the face conveyor. In this transfer station, as also in other such constructions (DE-2659855 and DE-2237976) the line of pans of the gate conveyor is securely connected to the frame by its ramp pan. In the transfer station according to U.S. Pat. No. 4,673,079, this takes place by using bolts or screws. On the connection side of the frame lying opposite the gate conveyor, the chain drum support for the return drum of the gate conveyor together with a hood-shaped housing covering the return drum is attached.

It is an object of the invention, inter alia, to construct a transfer station of the aforementioned general type so that it can be used optionally for left-hand or right-hand connection of the gate conveyor.

SUMMARY OF THE INVENTION

This object is achieved according to the invention due to the fact that the connections on the two opposite sides of the frame are constructed to be identical to each other and that the ramp pan of the gate conveyor and the chain drum support for its return drum are provided with coupling members complementing the connections of the frame.

A transfer station or assembly constructed in accordance with the invention serves for transferring material from a first or gate scraper-chain conveyor to a second or face scraper-chain conveyor each conveyor having a circulatable scraper-chain assembly with the first and second conveyors extending substantially perpendicular to one another. In accordance with the invention the transfer station assembly comprises:

a frame through which upper and lower runs of the first and second conveyor scraper-chain assemblies are guided and connection means on the exterior of the frame for effecting connection with an endmost pan of the first conveyor and with a support for a rotatable drum around which the scraper-chain assembly of the first conveyor is entrained, wherein the connection means is composed of identical connection components such as blocks permitting the drum support and the endmost pan to be positionally interchanged.

Due to the fact that the connection components or blocks have an identical construction on the two opposite sides of the frame, the frame is suitable both for left-hand abutment as well as for right-hand abutment of the first or gate conveyor. On the side of the frame opposite the gate conveyor, the chain drum support for the return drum of the gate conveyor can be fitted by using the connection blocks located here. For this purpose the support is provided with connection components, such as blocks or the like, complementing the connection components on the frame.

The connection components preferably consist of narrow web-like, strip-like or bar-like components welded to the two frame sides at a distance spaced apart to correspond to the pan width of the endmost ramp pan of the gate conveyor. The corresponding connection components of the ramp pan of the gate conveyor are in this case located on both sides of the ramp pan and can be welded externally to its side walls.

Particular advantages with respect to the attachment of the return drum of the gate conveyor results, if according to the further feature of the invention, which has independent significance, the connection components located in pairs on the opposite sides of the frame are both constructed as open bearing half-shells. The connection components of the chain drum support are in this case constructed as complementary bearing half-shells which respectively with the associated components of the frame complement each other as a closed bearing seating for a shaft of the return drum of the gate conveyor. This results in a particularly simple construction and also offers the possibility of easy assembly for the chain drum support.

According to a further feature of the invention, the connection components of the frame are provided with pockets for receiving coupling pieces. In this case, the ramp pan of the gate conveyor comprises connection components exactly complementing the components of the frame and the pockets of all these components receive dog-bone type coupling members. This offers the possibility of connecting the ramp pan of the gate conveyor to the frame of the transfer station by means of the couplers customary for the conveyor pans of face conveyors, to produce a particularly strong yet flexible connection. Indeed on account of the play of the couplers in the pockets, a connection results with some pre-determined clearance of motion of the ramp pans with respect of the frame of the transfer station. This clearance of motion facilitates adaptive movements of the gate conveyor with respect to the frame, which is to be regarded as advantageous. A particularly firm connection results, if at each coupling point, two coupling members are provided in parallel arrangement. If the connections on the frame are constructed as open bearing shells, then each connection of the frame above and below the bearing half-shell, respectively acquires a laterally open pocket, which together with the corresponding pocket on the associated connecting component of the ramp pan receives two coupling members lying parallel one above the other.

On the connection side of the ramp pan of the gate conveyor, the opening bearing half-shells are appropriately closed with detachable covers. These covers can simultaneously serve for securing the coupling members, if they simply overlap the laterally open pockets.

As mentioned, complementary bearing half-shells, as the counter-connecting components, are fitted to the connection components of the frame arranged on the side of the chain drum support. The resultant open bearing shells, thus form the bearing for the shaft of the return drum. In this case, the connection of the complementary bearing half-shells to the connection components of the frame appropriately takes place by means of a screw clamping connection. An advantageous arrangement has coupling members, which comprise a head able to be inserted in the pocket of one of the connecting components on the frame and a screw threaded shank. In this case, the threaded shank may be connected securely to the connection components of the drum support by passing the shank through a hole in a flange or projection of the complementary component with the connection being established by a nut screwed onto the threaded shank. The coupling members for this purpose can be produced in a simple manner due to the fact that a full coupling member, as is used for the connection of the gate conveyor, is machined to half its length to provide the threaded shank. However, on the other hand, the coupling member may be provided with a stepped bore for an inserted bolt. In this case, the screw-threaded coupling member may be produced from a normal coupling member by bisecting the latter.

It is recommended to cover the return drum for the gate conveyor by a removable covering hood, which can be fitted to the complementary connecting components.

The invention may be understood more readily, and various other aspects and features of the invention may become apparent, from consideration of the following description.

BRIEF DESCRIPTION OF DRAWINGS

An embodiment of the invention will now be described, by way of example only, with reference to the accompanying drawings, wherein:

FIG. 2 is a cross-section taken along the line II—II of FIG. 1;

FIG. 3 shows a coupler usable with the transfer station assembly;

FIG. 4 and 5 show alternative forms of further couplers usable with the transfer station assembly;

DESCRIPTION OF PREFERRED EMBODIMENT

Figure 1:
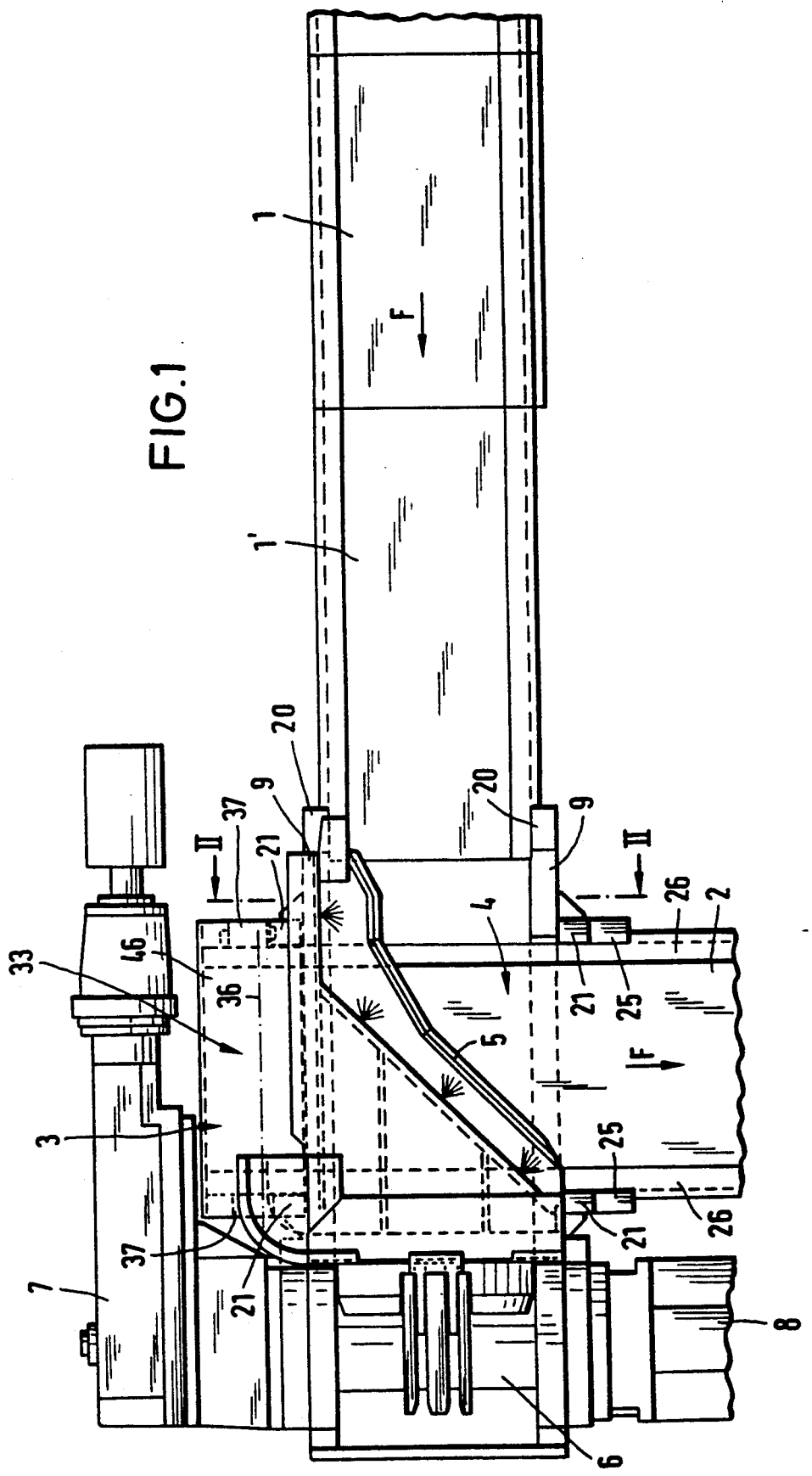
FIG. 1 is a plan view of a transfer station assembly constructed in accordance with the invention.

In the drawings, an end region of a face conveyor is designated by the reference numeral 1 and an end region of a gate or roadway conveyor extending at right angles to the face conveyor 1 in a long wall face/gate transition region of an underground mining operation is designated by the reference numeral 2. Both conveyors 1 and 2 take the form of a scraper-chain conveyor, preferably a central or double central chain scraper-chain conveyor. At the intersection zone of the two conveyors 1 and 2 there is a transfer station assembly 3 at which material is transferred from the face conveyor 1 to the gate conveyor 2. The conveying direction of the two conveyors 1 and 2 are indicated by the arrows F.

The transfer station assembly 3 consists of a sturdy frame 4, which is constructed as a cross frame. Above the frame 4 there is an inclined deflector bar 5 which deflects and discharges a part of the material conveyed in the top run of the face conveyor 1, and more particularly the larger pieces of material, laterally into the underlying top run of the gate conveyor 2. A driving drum 6 for driving the scraper-chain assembly of the face conveyor 1 with its support is mounted on the frame at a position remote from an endmost channel section or ramp pan of the conveyor 1. The reference numerals 7 and 8 designate the drive means for driving the drum 6 of the conveyor 1.

The transfer station assembly 3 as illustrated and described with the frame 4 and the attached parts is to a large extent known in its basic construction from U.S. Pat. No. 4,673,079 which is herein incorporated by reference.

As can be seen from the vertical section according to FIG. 2, the frame 4 of the assembly 3 consists of two stout vertical side walls 9, generally aligned with the side walls of the ramp pan 11 of the face conveyor 1. The side walls 9 are connected together to form the torsion-resistant frame by welded in cross plates 11–14. In FIG. 2, the scrapers of the scraper chain assembly of the face conveyor 1 which run between the walls 9 are shown as dot-dash lines 15. The conveying top run 16 of the gate conveyor 2 lies between the top run 17 and the bottom run 18 of the face conveyor 1 while the bottom run 19 of the gate conveyor 2 is located below the bottom run 18 of the face conveyor 1. The endmost ramp pan 1' of the face conveyor 1 is connected at 20 to the frame 4, as shown in FIG. 1. This connection can be a bolted or screwed connection or a 'dog bone' connection, as is customary for the connection of conveying pans of scraper-chain conveyors.

Welded to the exteriors of each of the two side walls 9 of the frame 4, are two connection components or blocks 21 which take the form of plates or bars designed to receive sturdy couplers 24, 39, 40. On each connection side of the frame 4, the two connection blocks 21 are spaced apart to correspond approximately to the width of an endmost ramp pan of the gate conveyor 2. The connection blocks 21 have an identical construction. As shown in particular in FIGS. 2, 6 and 7 each connection block 21 is constructed as an open bearing half-shell so that on the side remote from the associated side wall 9, the connection blocks 21 each provides a depression 22. Above and below this depression 22, each connection block 21 has laterally open pockets 23.

Figure 6:
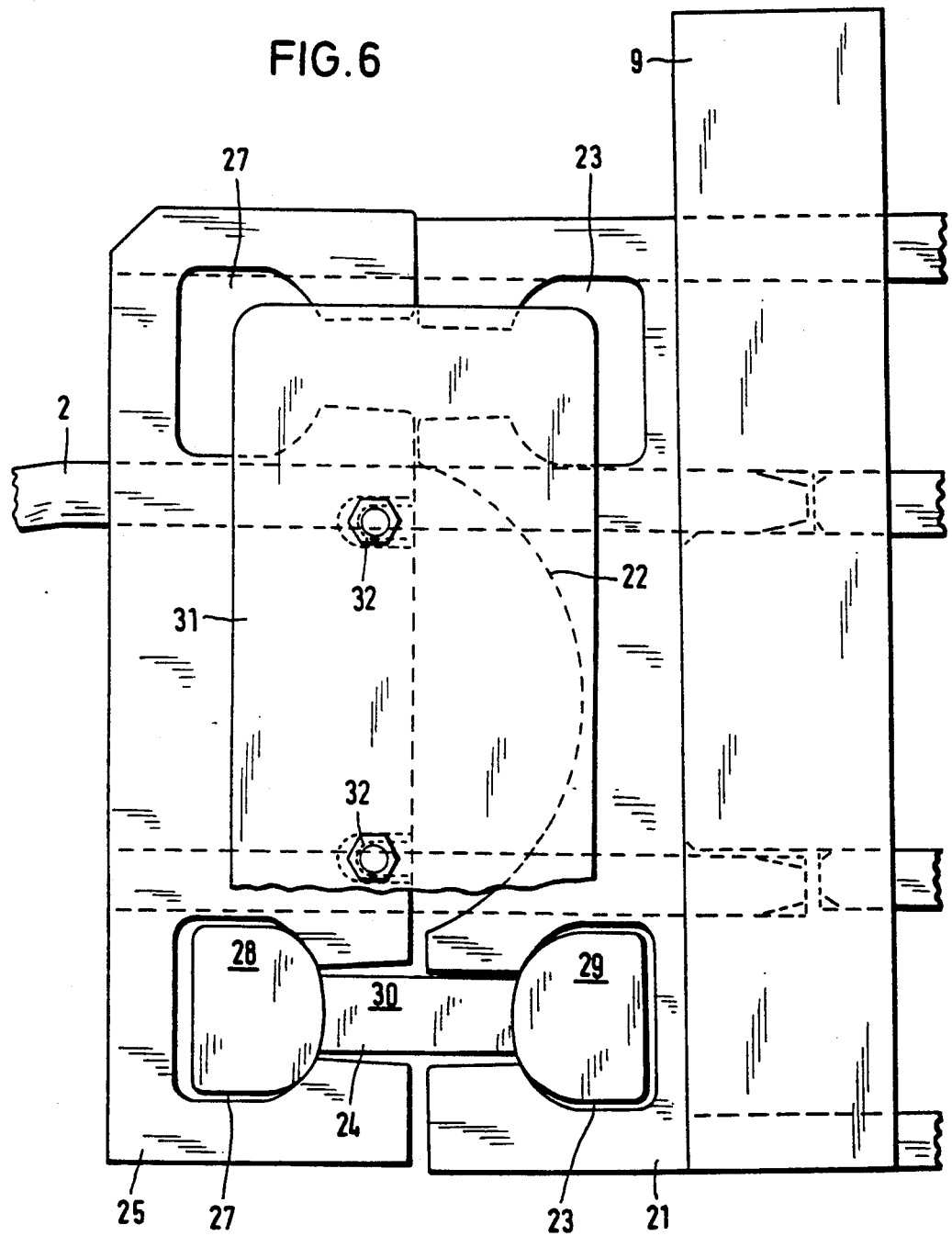
FIG. 6 is an enlarged view of part of the transfer station assembly as depicted in FIG. 2 which shows the connection of the ramp pan of the gate conveyor.

As shown in FIGS. 2 and 6, the pockets 23 of the connection blocks 21 associated with the conveyor 2 receive coupling members 24, which serve for connecting the endmost ramp pan of the conveyor 2 to the frame 4. The endmost ramp pan of the conveyor 2 is provided with connection components or blocks 25 corresponding to the connection blocks 21. These connection blocks 25 likewise consist of sturdy plates or bars, and, as shown in FIG. 1, these blocks 25 are welded externally to the two lateral side walls 26 of the ramp pan of the gate conveyor 2. In contrast to the connection blocks 21 on the frame 4 the blocks 25 have no depressions, but do possess pockets 27, which correspond to the pockets 23 and together with the latter locate the coupling members 24. The coupling members 24 may be those customary in conveyor pan connections as depicted in FIG. 3. Thus, each coupling member 24 has two heads 28 and 29, which are connected in one piece by a shank 30. Thus very approximately, the coupling member 24 acquires an H-shaped contour resembling a 'dog bone'.

FIG. 2 shows the connection of the endmost ramp pan of the gate conveyor 2 to the frame 4 by the two coupling members 24 introduced from the sides of the pan into the associated pockets 23, 27. In FIG. 6, only the lower coupling member 24 is inserted in the respective pockets 27, 23. The bearing depression 22 between the pockets 23 is here closed by a cover plate 31, which is detachably connected to one of the respective connection blocks 25 by means of screws 32. The cover plate 31 at the same time serves for securing the coupling members 24 in the pockets 27, 23. For this purpose the cover plate 31 is constructed so that it covers the pockets 23, 27 laterally, as is shown in FIG. 6 only for the upper set of pockets 23, 27.

Since the coupling members 24 are arranged with clearance in the pockets 23, 27 of the connection blocks 21, 25, a certain clearance of motion of the endmost ramp pan of the conveyor 2 with respect to the frame 4 results. In FIG. 6, the clearance of motion is indicated by the offset of the components 21 and 25 with respect to each other.

Figure 7:
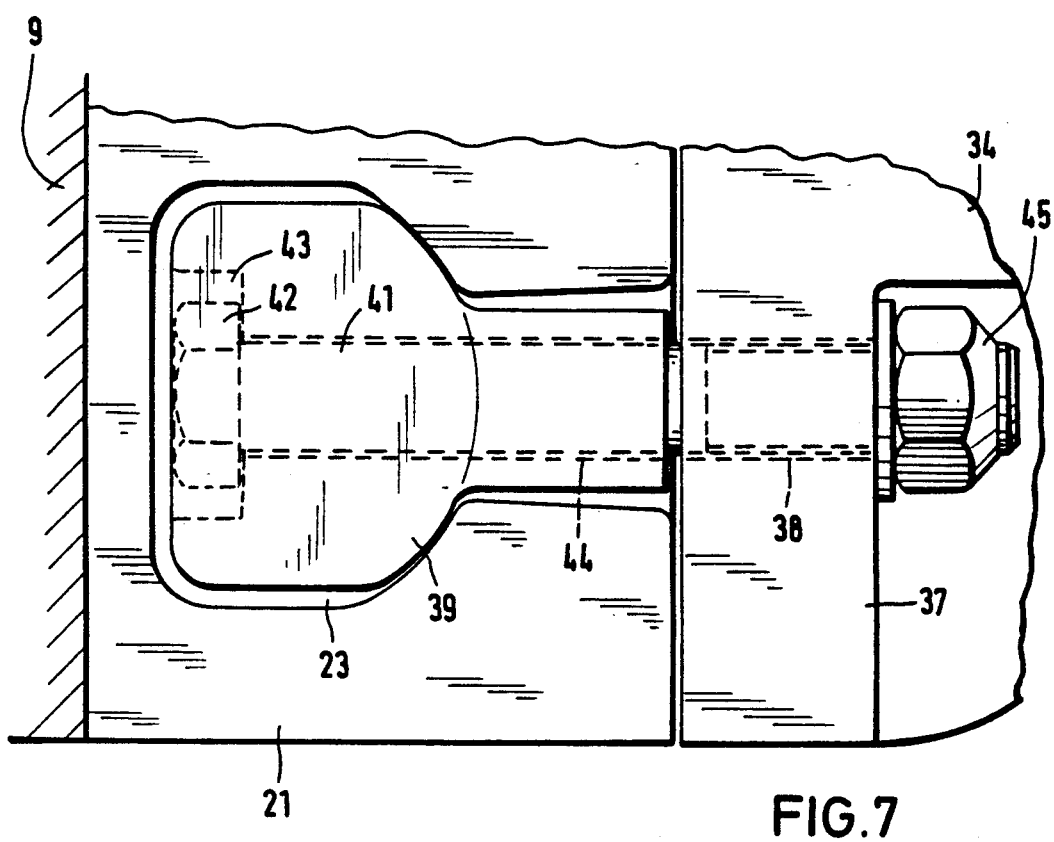
FIG. 7 is an enlarged view of the transfer station assembly as depicted in FIG. 2 which shows the connection of the chain drum support.

Since the frame 4 respectively comprises two connecting components 21 with the same construction and arrangement on its two sides, the gate conveyor 2 can be connected with its ramp pan optionally on the left-hand side or on the right-hand side to the frame 4, thus to one or other side wall 9 of the latter by means of the same coupling members 24. The respective other free side of the frame 4 then serves for the connection of a support 33 for a chain drum 35 for the scraper-chain assembly of the gate conveyor 2. The chain drum support 33 itself comprises two open bearing half-shells 34, which are constructed in a complementary manner with respect to the bearing half-shells forming the connection blocks 21. Thus likewise the half-shells 34 define depressions 35, which in the fitted state, together with the depressions 22 of the bearing half-shells defined by the component 21, form closed cylindrical bearing openings for a shaft 36 of the drum 35. The two bearing half-shells 34 of the support 33 also have outwardly directed coupling flanges 37, which, as shown in FIGS. 2 and 7, are provided with bores 38. The connection of the half-shells 34 to the connection blocks 21 takes place by means of coupling screws, which are constructed either according to FIG. 4 or according to FIGS. 5 and 7. According to FIG. 4, the coupling screw consists of a body 39 and a threaded shank 40 connected securely or integrally therewith. This coupling screw may be made from a coupling member (24 FIG. 3) by machining the latter over half its length to provide the threaded shaft 40.

In the embodiment according to FIGS. 5 and 7, a longitudinal bore is produced in the body 39, and in this case a bolt 41 is inserted through the hole to provide the threaded shank and lies with its screw head 42 in a recess 43 in the body 39, as shown in FIG. 7. The body 39 can in this case be made as from two halves divided centrally. The shank 40 or bolt 41 of the coupling screw penetrates one of the bores 38 in the flange 37 of the corresponding bearing half-shell 34. For the connection and secure clamping of the bearing half-shells 34, nuts 45 are screwed onto the threaded ends of the bolts 41 or shanks 40 and tightened.

As aforementioned, the return drum 35 is mounted by its bearing parts in the cylindrical bearing openings of the bearings formed by the bearing half-shells 21, 34. A covering hood 46 is placed on the bearing half-shells 34 to cover the return drum towards the outside. By its ends 47 the covering hood 46 overlaps the coupling flanges 37 and can be fixed here for example by means of screws. The arrangement may also be such that the covering hood 46 also overlaps the plate-shaped blocks 21 by its upper, elongated end, and is supported thereon.

The aforedescribed chain drum support using the bearing half-shells 34 is characterised by a simple construction. It allows easy assembly and dismantling of the chain drum, since the bearings for the shaft of the drum formed by the blocks 21 and the complementary bearing half-shells 34 is constructed to be divided. The construction of the blocks 21 as complementary bearing half-shells does not impede the connection of the ramp pan of the conveyor 2 to the frame 4, but it advantageously facilitates the connection by means of the coupling members 24, as is shown above all in FIG. 6. On account of the symmetry of the connection blocks 21, both the ramp pan of the gate conveyor 2 as well as the chain drum support 33 can be fitted optionally on the left-hand side or on the right-hand side to the frame 4. The chain drum support 33 is also characterised by small overall dimensions.

We claim:

1. In a transfer station assembly for transferring material from a first scraper-chain conveyor to a second scraper-chain conveyor, each conveyor having a circulatable scraper-chain assembly with the first and second conveyors extending substantially perpendicular to one another; said assembly comprising a frame through which upper and lower runs of the first and second conveyor scraper-chain assemblies are guided and connections means on the exterior of the frame for effecting connection with an endmost pan of the first conveyor and with a support for a rotatable drum around which the scraper-chain assembly of the first conveyor is entrained; the improvement comprising the connection means is composed of identical connection components permitting the drum support and the endmost pan to be positionally interchanged.

2. An assembly according to claim 1 wherein the endmost pan of the first conveyor and the drum support are also provided with complementary connection components which correspond to the connecting components on the frame.

3. An assembly according to claim 1 wherein the connection components are in the form of open bearing half-shells.

4. An assembly according to claim 2, wherein the connecting components on the frame and the connecting components on the drum support have depressions forming bearing half shells.

5. An assembly according to claim 1 wherein the connection components are provided with pockets for receiving couplers used to interconnect the connection components to the endmost pan and the drum support.

6. An assembly according to claim 1 wherein the frame has a pair of spaced-apart side walls and the connection components are provided on the exteriors of these side walls and are spaced-apart by a distance corresponding to the width of the endmost pan.

7. An assembly according to claim 6, wherein the connection components are in the form of plates or bars welded to the side walls of the frame.

8. An assembly according to claim 4, wherein there are provided pockets in the connection components on the frame above and below each depression for receiving detachable coupling members used to secure the drum support and the endmost pan to the frame.

9. An assembly according to claim 8, wherein the connection components on the endmost pan are also provided with corresponding pockets to receive the coupling members.

10. An assembly according to claim 9, wherein the coupling members engage in the associated pockets with clearance to connect the endmost pan to the frame in a tension proof but flexible manner.

11. An assembly according to claim 2, wherein the connection components on the endmost pan are in the form of plates or bars welded to the exteriors of side walls of the pan.

12. An assembly according to claim 4, wherein the depressions in the connection components associated with the endmost pan are each closed by means of a detachable cover.

13. An assembly according to claim 12, wherein the connection components are provided with pockets for receiving couplers used to interconnect the connection components to the endmost pan and the drum support and the covers serve to retain the couplers in the pockets.

14. An assembly according to claim 4, wherein the bearing half-shells in the connection components of the drum support and in the associated connection components of the frame combine to provide cyclindrical bearing recesses for receiving a shaft of the drum.

15. An assembly according to claim 14, wherein the connection components are provided with pockets for receiving couplers used to interconnect the connection components to the endmost pan and the drum support.

16. An assembly according to claim 15, wherein the couplers for engaging in the pockets of the connection components on the frame associated with the drum support have outwardly extending screw threaded shanks engaging through bores in the connection components of the drum support and receiving nuts.

17. An assembly according to claim 16, and further comprising a detachable cover or hood surrounding the drum.

* * * * *